(12) United States Patent
Minamihara et al.

(10) Patent No.: US 9,275,486 B2
(45) Date of Patent: Mar. 1, 2016

(54) COLLAGE IMAGE CREATING METHOD AND COLLAGE IMAGE CREATING DEVICE

(71) Applicant: SEIKO EPSON CORPORATION, Tokyo (JP)

(72) Inventors: Tetsuyuki Minamihara, Sapporo (JP); Eiji Tanaka, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/482,602

(22) Filed: Sep. 10, 2014

(65) Prior Publication Data

US 2015/0098664 A1    Apr. 9, 2015

(30) Foreign Application Priority Data

Oct. 7, 2013    (JP) .................................. 2013-209934

(51) Int. Cl.
G06T 11/60    (2006.01)
G06T 3/60    (2006.01)
G06T 3/40    (2006.01)

(52) U.S. Cl.
CPC . *G06T 11/60* (2013.01); *G06T 3/40* (2013.01); *G06T 3/4038* (2013.01); *G06T 3/60* (2013.01); *G06T 2200/32* (2013.01)

(58) Field of Classification Search
CPC .......................... G06T 2200/32; G06T 3/4038
USPC ............................. 382/100, 254; 345/634, 635
See application file for complete search history.

(56) References Cited

U.S. PATENT DOCUMENTS 7,155,033 B1 * 12/2006 Naveen et al. ................. 382/108
7,600,191 B2    10/2009 Yoshikawa et al.
7,961,938 B1 *  6/2011 Remedios ...................... 382/162
8,327,262 B2    12/2012 Tarumi
8,370,738 B2     2/2013 Osaka
2008/0075390 A1 *  3/2008 Murai et al. .................. 382/284
2008/0123993 A1 *  5/2008 Widdowson .................. 382/284
2008/0193048 A1 *  8/2008 Sun et al. ...................... 382/284
2009/0263038 A1 * 10/2009 Luo et al. ...................... 382/254

(Continued)

FOREIGN PATENT DOCUMENTS

EP    0459711 A2      5/1991
EP     726543 A2 *    8/1996

(Continued)

OTHER PUBLICATIONS

Battiato et al. ("Smart Photo Sticking," Adaptive Multimedia Retrieval Retrieval, User, and Semantics, pp. 211-223, 2008).*

(Continued)

*Primary Examiner* — Yubin Hung
(74) *Attorney, Agent, or Firm* — Workman Nydegger

(57) ABSTRACT

A collage image creating method includes a first step that creates a collage image by determining arrangements of the plurality of images according to a placement algorithm including a rotation angle of each image as a parameter; and a second step that recreates a collage image by re-executing the first step to at least one of a change due to an addition or deletion of an image which configure the collage image, a change in arrangement position of at least one image among images which are included in the collage image, a change in rotation angle of at least one image among images which are included in the collage image, and a change in arrangement size of at least one image among images which are included in the collage image.

5 Claims, 9 Drawing Sheets

(56) References Cited

U.S. PATENT DOCUMENTS

| | | | |
|---|---|---|---|
| 2010/0063876 A1* | 3/2010 | Godden et al. ............ 705/14.43 |
| 2010/0321405 A1* | 12/2010 | MacInnes et al. ............ 345/635 |
| 2012/0206671 A1* | 8/2012 | Takeuchi et al. ................ 349/69 |
| 2013/0002699 A1 | 1/2013 | Watanabe et al. |
| 2013/0026223 A1* | 1/2013 | Murray et al. ................ 235/375 |
| 2014/0280054 A1* | 9/2014 | Karunakaran et al. ........ 707/722 |
| 2014/0307980 A1* | 10/2014 | Hilt ............................... 382/284 |

FOREIGN PATENT DOCUMENTS

| | | |
|---|---|---|
| JP | 04-036877 | 2/1992 |
| JP | 2002-262057 | 9/2002 |
| JP | 2003-333308 | 11/2003 |
| JP | 2005-032219 | 2/2005 |
| JP | 2008-129702 | 6/2008 |
| JP | 2009-157938 | 7/2009 |
| JP | 2010-117950 | 5/2010 |
| JP | 2011-113509 | 6/2011 |
| JP | 2013-016973 | 1/2013 |

OTHER PUBLICATIONS

Google ("Picasa collage instructions," Quad-Cities Computer Society Digital SIG, Nov. 25, 2015, download from the Internet on Apr. 4, 2015).*

Shum et al. ("Construction of Panoramic Image Mosaics with Global and Local Alignment," International Journal of Computer Vision, 36(2):101-130, Feb. 2000).*

Google Inc., "Picasa", [online], [retrieved Sep. 9, 2013], URL:http://picasa.google.co.jp/intl/ja/.

* cited by examiner

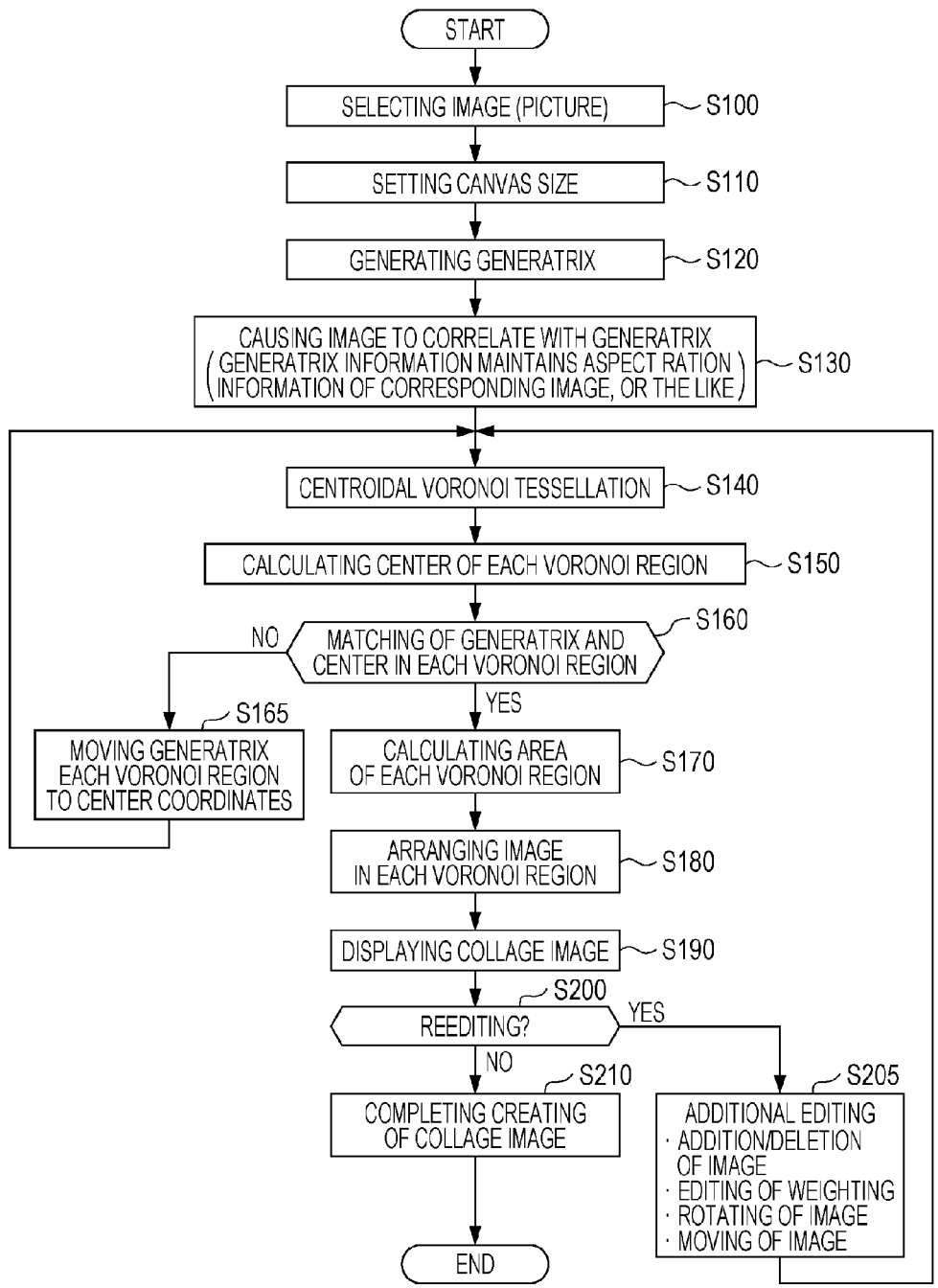

ARRANGING GENERATRIX

VORONOI REGION TESSELLATION

CALCULATING CENTER

REPEATING UNTIL BEING CONVERGED BY SETTING CENTER TO NEW GENERATRIX

DISTANCE FUNCTION IN WHICH ROTATION ANGLE θn AT THE TIME OF ARRANGING IS FURTHER TAKEN INTO CONSIDERATION $$d(x, y)_j = \sqrt{\frac{(x')^2}{A_j} + A_j \times (y')^2}$$

$$= \sqrt{\frac{(x \times \cos\theta_j - y \times \sin\theta_j)^2}{A_j} + A_j \times (x \times \sin\theta_j + y \times \cos\theta_j)^2}$$

FIG. 6
AFTER CONVERGENCE
(GENERATRIX COORDINATES ≈ CENTER COORDINATES)
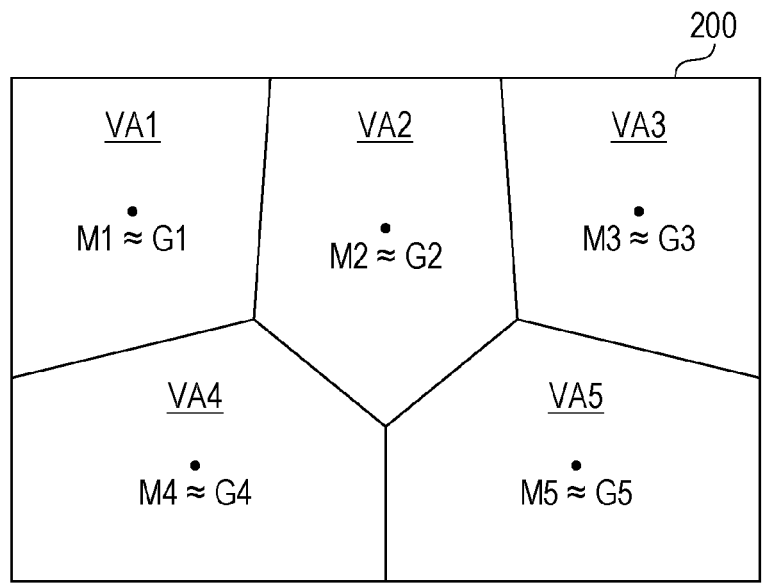
ARRANGING IMAGE IN GENERATRIX
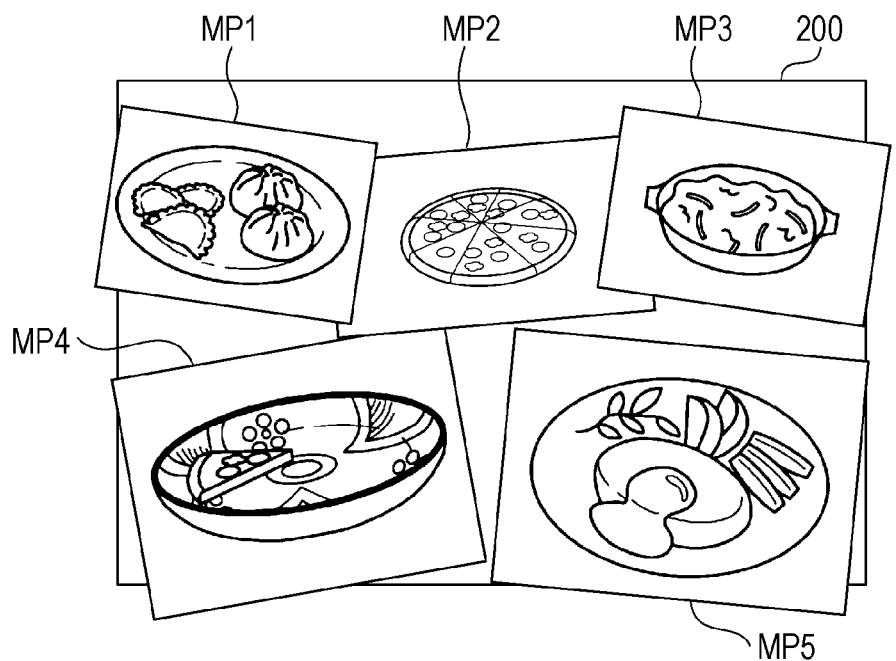

WHEN Rij/Ri≥Rij/Rj, IMAGE MPi IS ARRANGED AT FRONT SIDE
WHEN Rij/Ri<Rij/Rj, IMAGE MPj IS ARRANGED AT FRONT SIDE

MPj WITH SMALLER AREA IS ARRANGED AT FRONT SIDE
(AREA: MP1<MP2<MP3<MP4<MP5)

FIG. 8
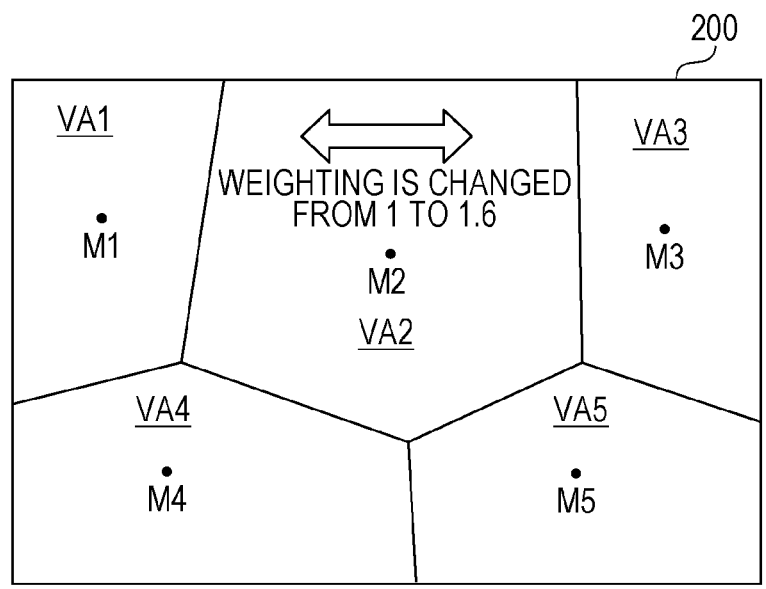
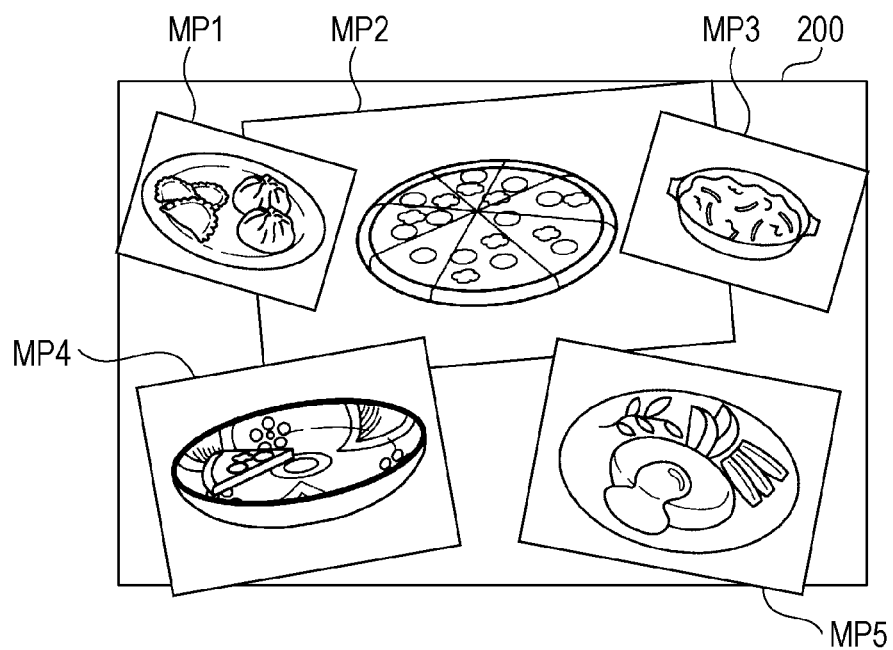

FIG. 9
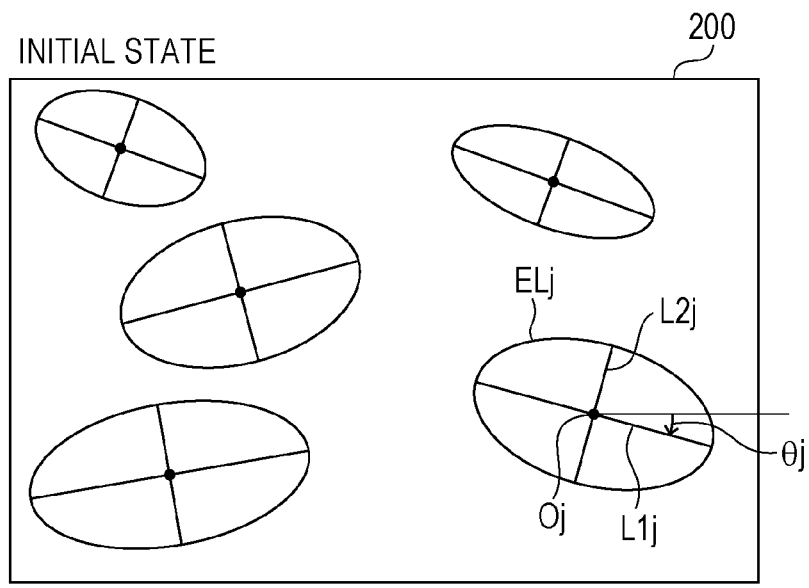
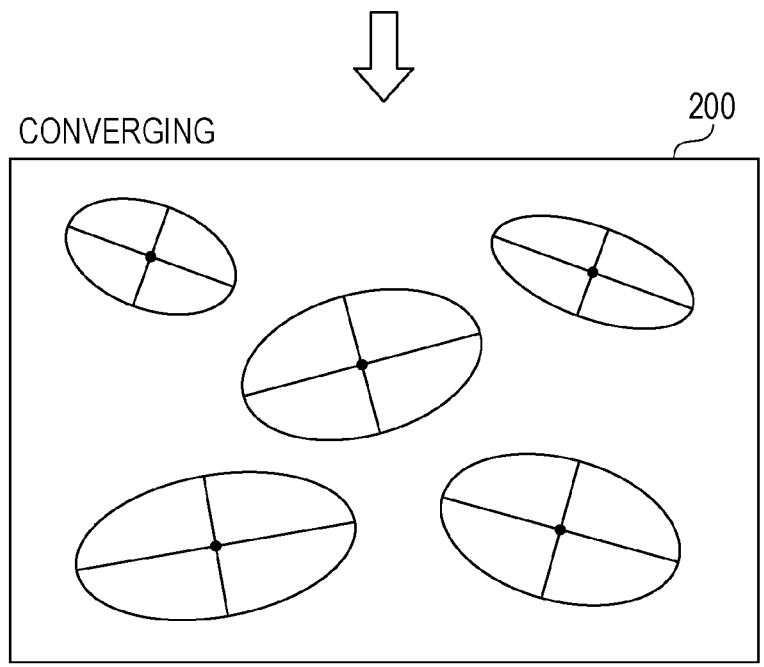

COLLAGE IMAGE CREATING METHOD AND COLLAGE IMAGE CREATING DEVICE

BACKGROUND

1. Technical Field

The present invention relates to a collage image creating program, a collage image creating method, and a collage image creating device.

2. Related Art

In the technology in JP-A-2013-16973, since a process of generating a mosaic image of a target image is performed by arranging a material image in a mosaic shape, it is not possible to change a position or size of the material image which is arranged in the generated mosaic image. In addition, the technology in JP-A-2013-16973 is not a technology of creating a collage image. In the technology in "Google Inc., "Picasa", a collage image is generated by obtaining an automatic layout with respect to a plurality of images, and it is possible to change a position or size of an arbitrary image which is arranged in the collage image. However, a rotation of an image is not taken into consideration. In addition, when a position or size of one image which is included in the collage image is changed, it is necessary to adjust the entire balance by manually changing a position or size of another image by a user. When there are many images included in the collage image, the task of adjusting the entire balance is a big burden for a user.

In the technology in JP-A-2013-16973, since a process of generating a mosaic image of a target image is performed by arranging a material image in a mosaic shape, it is not possible to change a position or size of the material image which is arranged in the generated mosaic image. In addition, the technology in JP-A-2013-16973 is not a technology of creating a collage image. In the technology in "Google Inc., "Picasa", a collage image is generated by obtaining an automatic layout with respect to a plurality of images, and it is possible to change a position or size of an arbitrary image which is arranged in the collage image. However, a rotation of an image is not taken into consideration. In addition, when a position or size of one image which is included in the collage image is changed, it is necessary to adjust the entire balance by manually changing a position or size of another image by a user. When there are many images included in the collage image, the task of adjusting the entire balance is a big burden for a user.

SUMMARY

The invention can be realized in the following forms or application examples.

(1) According to an aspect of the invention, there is provided a collage image creating program which creates a collage image by arranging a plurality of images, in which a first function of creating a collage image by determining arrangements of the plurality of images according to a placement algorithm including a rotation angle of each image as a parameter, and a second function of recreating a collage image by re-executing the first function according to at least one of a change due to an addition or deletion of an image which configure the collage image, a change in arrangement position of at least one image among images which are included in the collage image, a change in rotation angle of at least one image among images which are included in the collage image, and a change in arrangement size of at least one image among images which are included in the collage image are executed using a computer. According to the collage image creating program, it is possible to easily create a collage image in which a rotation angle of an image is taken into consideration. In addition, it is possible to easily recreate a collage image by re-executing a determination on arrangements of a plurality of images according to at least one of a change in arrangement position of at least one image among images which are included in the collage image, a change in rotation angle of at least one image among images which are included in the collage image, and a change in arrangement size of at least one image among images which are included in the collage image.

(2) In the collage image creating program, the first function may be a function in which a collage image is created by determining arrangements of the plurality of images according to a placement algorithm including the aspect ratio and the rotation angle of each image as parameters. It is possible to easily create a collage image in which an aspect ratio and a rotation angle of an image are taken into consideration.

(3) In the collage image creating program, the placement algorithm may be a centroidal voronoi tessellation in which a weighted distance function in which an aspect ratio and a rotation angle of the image are used as parameters is used. According to the collage image creating program, it is possible to easily calculate an arrangement position of an image.

(4) In the collage image creating program, the weighted distance function may be provided using any one of the following expressions.

$$d(x, y)_j = \sqrt{\frac{(x \times \cos\theta_j - y \times \sin\theta_j)^2}{f_1(A_j)} + f_2(A_j) \times \frac{(x \times \sin\theta_j + y \times \cos\theta_j)^2}{Q_j}}$$

$$d(x, y)_j = \frac{\frac{|x \times \cos\theta_j - y \times \sin\theta_j|}{f_1(A_j)} + f_2(A_j) \times |x \times \sin\theta_j + y \times \cos\theta_j|}{Q_j}$$

Here, x and y are coordinates of arbitrary points on a coordinate system in which a generatrix of a voronoi region is set to the origin, $\theta_j$ is a rotation angle of an image, $Q_j$ is a weight of an arrangement size arrangement size of the image, f1 ($A_j$) is a function which provides a positive value including a positive correlation with respect to the aspect ratio $A_j$, and f2 ($A_j$) is a positive constant which is not zero, or a function which provides a positive value with a positive correlation with respect to the aspect ratio $A_j$.

(5) In the collage image creating program, in the collage image, the overlapping order of the plurality of images may be determined so that an image of which an image size at a time of arranging is small is arranged at a front side in the collage image. According to the collage image creating program, it is possible to make visibility of each image not to be poor, since a small image is arranged at the front side compared to others.

(6) According to another aspect of the invention, there is provided a collage image creating method which includes creating a collage image by determining arrangements of a plurality of the images according to a placement algorithm including a rotation angle of each image as a parameter, and recreating a collage image by re-executing a determination on arrangements of the plurality of images according to at least one of a change due to an addition or deletion of an image which configure the collage image, a change in arrangement position of at least one image among images which are included in the collage image, a change in rotation angle of at least one image among images which are included in the collage image, and a change in arrangement size of at least one image among images which are included in the collage image. According to the collage image creating method, it is possible to easily create a collage image in which a rotation angle of an image is taken into consideration. In addition, it is possible to easily recreate a collage image by re-executing a determination on arrangements of a plurality of images according to at least one of a change in arrangement position of at least one image among images which are included in the collage image, a change in rotation angle of at least one image among images which are included in the collage image, and a change in arrangement size of at least one image among images which are included in the collage image.

(7) According to still another aspect, there is provided a collage image creating device which includes an image input unit which inputs a plurality of images which are used in a collage image; an input unit which inputs rotation angles when arranging the plurality of images, and weights of arrangement size of the plurality of images; and a control unit which creates a collage image by determining arrangements of the plurality of images according to a placement algorithm including rotation angles of the input plurality of images as parameters, in which the control unit recreates a collage image by re-executing a determination on arrangements of the plurality of images according to at least one of a change due to an addition or deletion of an image configuring the collage image, a change in arrangement position of at least one image among images which are included in the collage image, a change in rotation angle of at least one image among images which are included in the collage image, and a change in arrangement size of at least one image among images which are included in the collage image. According to the collage image creating device, it is possible to easily create a collage image in which a rotation angle of an image is taken into consideration. In addition, it is possible to easily recreate a collage image by re-executing a determination on arrangements of the plurality of images according to at least one of a change in arrangement position of at least one image among images which are included in the collage image, a change in rotation angle of at least one image among images which are included in the collage image, and a change in arrangement size of at least one image among images which are included in the collage image.

In addition, the invention can be executed in various forms, such as a collage image creating method, a collage image creating device, a storage medium which is not temporary (non-transitory storage medium) which stores the collage image creating program, or the like, for example, in addition to the collage image creating program.

BRIEF DESCRIPTION OF THE DRAWINGS

The invention will be described with reference to the accompanying drawings, wherein like numbers reference like elements.

FIG. 2 is an explanatory diagram which illustrates a creation flowchart of the collage image.

FIG. 6 is an explanatory diagram which describes an arrangement of each material image in the collage image.

FIG. 8 is an explanatory diagram which describes a case in which a parameter of the distance function is changed.

FIG. 9 is an explanatory diagram of a determining algorithm when arranging a material image which is used in a second embodiment.

DESCRIPTION OF EXEMPLARY EMBODIMENTS

First Embodiment

Figure 1:
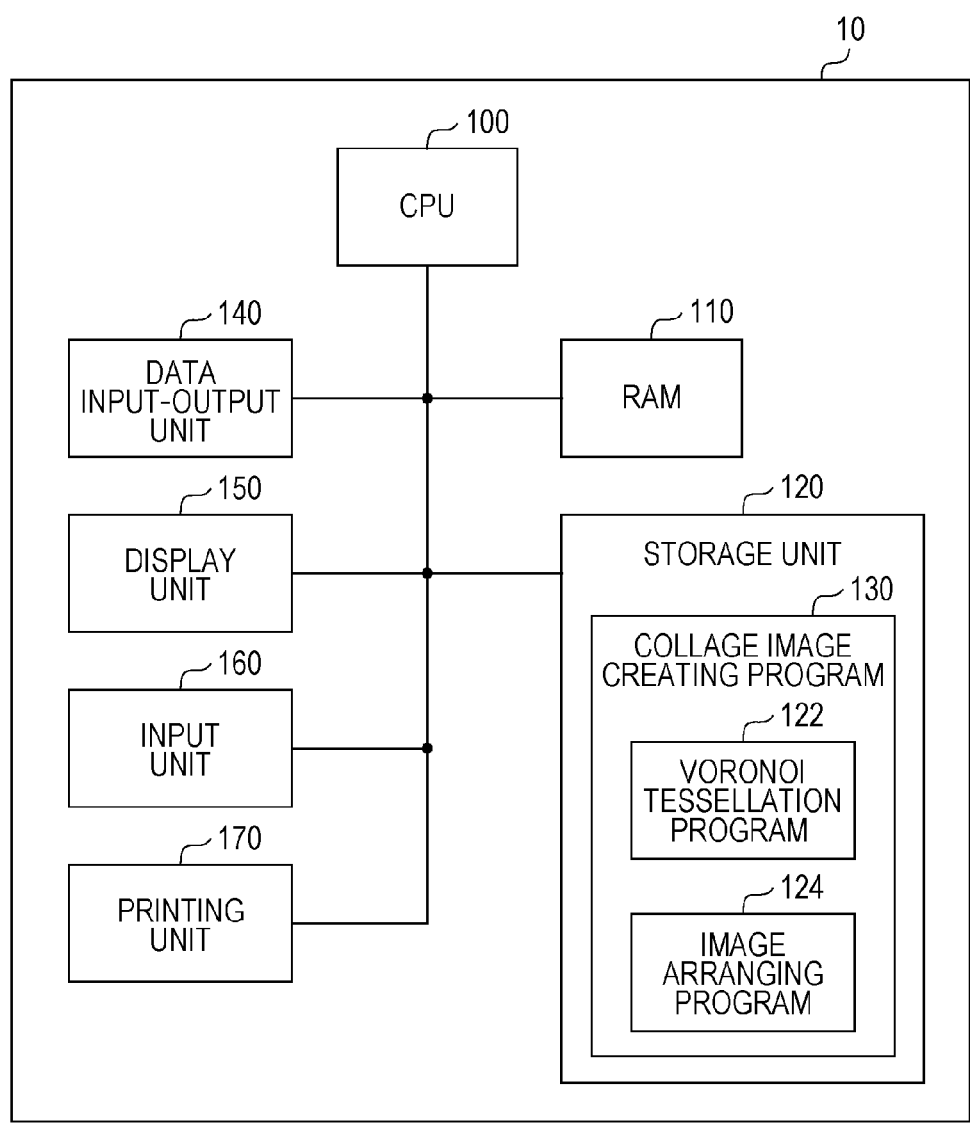
FIG. 1 is an explanatory diagram which illustrates a block configuration of a collage image creating device.

FIG. 1 is an explanatory diagram which illustrates a block configuration of a collage image creating device. A collage image creating device 10 includes a CPU 100, a RAM 110, a storage unit 120, a data input-output unit 140, a display unit 150, an input unit 160, and a printing unit 170. The storage unit 120 includes a collage image creating program 130. The CPU 100 functions as a control unit which controls various operations of the collage image creating device 10. The collage image creating program 130 includes a voronoi tessellation program 122, and an image arranging program 124. In the specification, the "collage image" means an image in which a plurality of images as materials (referred to as "image components") are arranged on a canvas. The "canvas" means the entire region in which the plurality of images are arranged (also referred to as "image arranging region"). The voronoi tessellation program 122 causes the CPU 100 to execute a function of performing the voronoi tessellation with respect to the canvas. As will be described later, as a distance function which is used in the voronoi tessellation, it is possible to use a distance function in which (a) an aspect ratio of each image, (b) a rotation angle of each image, and (c) a weight of arrangement size of each image are set to parameters. Each of voronoi region is used as a region in which one image is arranged. Accordingly, the number of voronoi regions (that is, number of generatrix in voronoi regions) is set to be equal to the number of images n (n is integer which is equal to or greater than 2). The image arranging program 124 causes the CPU 100 to execute a function of arranging each image in the voronoi region.

The data input-output unit 140 is used when inputting a plurality of images for a collage image, and outputting a created collage image. In other words, the data input-output unit 140 functions as an image input unit which inputs the plurality of images which are used in the collage image. A destination of inputting-outputting of image data is a recording medium, an image processing device, or the like. The display unit 150 is used when displaying the created collage image. The operation input unit 160 is used when inputting a rotation angle of each image, or a weight of an arrangement size of each image. The printing unit 170 is used when printing the created collage image. In addition, the printing unit 170 can be omitted.

FIG. 2 is an explanatory diagram which illustrates a creation flowchart of the collage image. In step S100, a plurality of images (pictures, or the like) are selected. The collage image creating program 130 may cause a user to select the plurality of images by displaying a plurality of images which are usable on the display unit 150. The collage image creating program 130 sets the following parameters regarding each image (j denotes order of image).

(a) aspect ratio $A_j$ of each image
(b) rotation angle $\theta_j$ of each image
(c) weight $Q_j$ of each image (positive value except for 0)

As the aspect ratio $A_j$, it is possible to use an input aspect ratio of each image as is. The rotation angle $\theta_j$ and the weight $Q_j$ of the arrangement size can be designated by a user in each individual image. The rotation angle $\theta$ may be set to zero regarding all of images, however, it is preferable to set the rotation angle $\theta_j$ to a value except for 0 regarding at least one image. In addition, the weight $Q_j$ of an arrangement size may be set to the same value (for example, 1.0) regarding all of images, however, it is preferable to set the weight $Q_j$ of the arrangement size to a value which is different from that of another image regarding at least one image. However, one or both of the rotation angle $\theta$ and the weight $Q_j$ of the arrangement size may be automatically set by the collage image creating program 130, without depending on an input by a user. For example, the collage image creating program 130 generates a random number, and can also set one or both of the rotation angle $\theta_j$ and the weight $Q_j$ according to the obtained random number.

In step S110, the collage image creating program 130 sets a size of the canvas on which the collage image is created. The canvas size may be input by a user. In steps S120 to S165, the voronoi tessellation program 122 executes the voronoi tessellation process of the canvas.

Figure 3A:
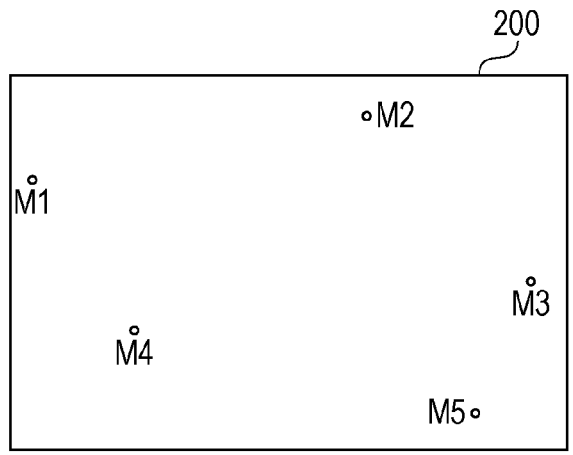
FIGS. 3A to 3C are explanatory diagrams of a voronoi tessellation process.
Figure 3B:
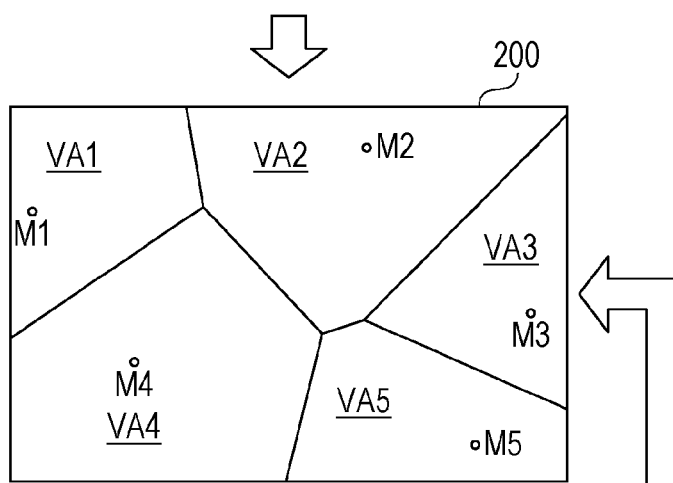
Figure 3C:
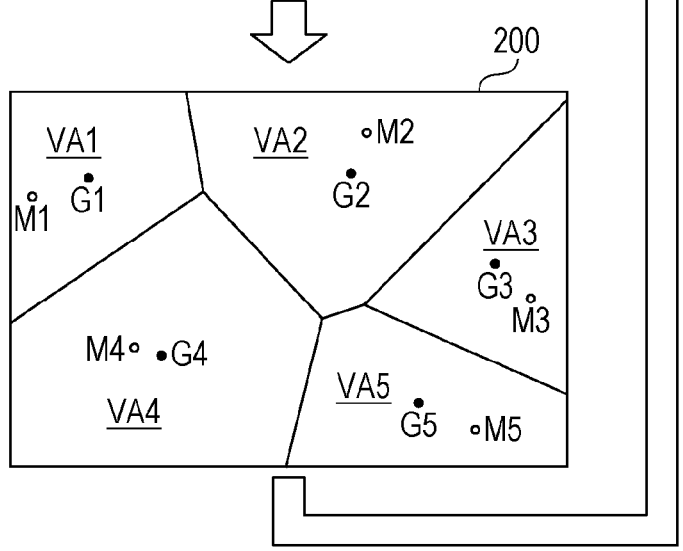

FIGS. 3A to 3C are explanatory diagrams of the voronoi tessellation process. In step S120 in FIG. 2, as illustrated in FIG. 3A, the generatrix M1 to Mn of the same number as the number n of an image (n is integer equal to or greater than 2) are created on the canvas 200. In addition, in the following description, the description will be made by setting the number n of images to five.

In step S130, the voronoi tessellation program 122 causes images to be correlated with each of generatrices M1 to Mn. At this time, as information regarding the generatrix $M_j$ (j denotes order of generatrices), the aspect ratio $A_j$, the rotation angle $\theta_j$, and the weight $Q_j$ of arrangement size are maintained, in addition to the coordinates on the canvas 200.

In step S140, as illustrated in FIG. 3B, the voronoi tessellation program 122 performs voronoi tessellation with respect to the canvas 200 so as to be divided into VA1 to VAn using the generatrices M1 to Mn. According to the embodiment, a so-called centroidal voronoi tessellation is executed. In addition, according to the embodiment, as the distance function in the voronoi tessellation, a weighted distance function in which the aspect ratio $A_j$, the rotation angle $\theta_j$, and the weight $Q_j$ of arrangement size are used as parameters is used, without using a physical distance (Euclidean distance) from the generatrix. However, it is also possible to use a distance function which does not include one or two of the three parameters of $A_j$, $\theta_j$ and $Q_j$. For example, a weighted distance function in which the aspect ratio $A_j$ and the rotation angle $\theta_j$ are set to parameters, without including the weight $Q_j$ of arrangement size of the image may be used. In addition, a weighted distance function in which the aspect ratio $A_j$ and the weight $Q_j$ of arrangement size are set to parameters, without including the rotation angle $\theta_j$ may be used. A specific example of the distance function will be described later.

In step S150 in FIG. 2, as illustrated in FIG. 3C, the voronoi tessellation program 122 calculates centers G1 to Gn of each of regions VA1 to VAn. In step S160, the voronoi tessellation program 122 determines whether or not the positions of center G1 to Gn of each of the regions VA1 to VAn and corresponding positions of the generatrices M1 to M5 match in a tolerance (whether or not centroidal voronoi tessellation process is converged). When the process is not converged, the process of the voronoi tessellation program 122 shifts to step S165, and shifts to step S140 by setting the center G1 to Gn to new generatrices M1 to Mn. In this manner, the voronoi tessellation program 122 repeats steps S140, S150, S160, and S165 until the center G1 to Gn and corresponding egeneratrices M1 to M5 match in the tolerance.

Figure 4:
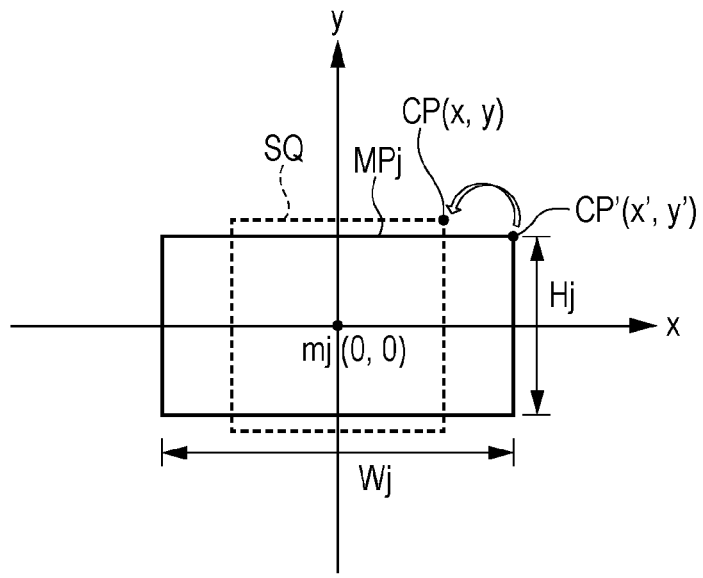
FIG. 4 is an explanatory diagram which describes a distance function in which an aspect ratio of a material image is taken into consideration.

FIG. 4 is an explanatory diagram which describes a distance function in which an aspect ratio of an image is taken into consideration. The distance function is a function which seeks for a conversion distance $d_j$ between an arbitrary point on the canvas 200 and the generatrix $M_j$. In the following description, for ease of calculation, the description will be made using a coordinate system in which the generatrix $M_j$ is set to the origin (0,0).

In usual voronoi tessellation, a distance function d (x, y)$_j$ which denotes a distance between arbitrary points (x, y) and the generatrix $M_j$ (0,0) is provided in the following Expression (2).

$$d(x,y)_j = \sqrt{x^2+y^2} \quad (2)$$

As illustrated in FIG. 4, the aspect ratio $A_j$ of the image $MP_j$ is a value which is obtained by dividing the width $W_j$ of the image $MP_j$ by the height $H_j$ ($W_j/H_j$). For example, an aspect ratio $A_j$ of a picture which is taken using a digital camera corresponding to a film of 35 mm is 1.5. When the aspect ratio $A_j$ is taken into consideration as a parameter of a distance function, first, a square SQ with the same area as that of the image $MP_j$ is presumed. In addition, coordinate transformation from (x', y') to (x, y) in which the apex CP' of the image $MP_j$ is moved to the apex CP of the square SQ is taken into consideration. The coordinate transformation is provided using the following Expressions (3a) and (3b);

$$x = \frac{x'}{\sqrt{A_j}} \quad (3a)$$

$$y = y' \times \sqrt{A_j} \quad (3b)$$

when substituting the Expressions (3a) and (3b) in the expression (2), the following expression (4) is obtained.

$$d(x', y')_j = \sqrt{\frac{(x')^2}{A_j} + A_j \times (y')^2} \quad (4)$$

The meaning of the distance function d(x', y')$_j$ can be understood as follows. For example, in a case of the image $MP_j$ which is vertically long as illustrated in FIG. 4, the aspect ratio $A_j$ is larger than 1. Accordingly, the term (x')$^2$/$A_j$ of the horizontal coordinate on the right side of the Expression (3) becomes a smaller value compared to a term x2 of the horizontal coordinate in the Expression (1). On the other hand, the term $A_j \times (y')2$ of the vertical coordinate on the right side of the Expression (3) becomes a larger value compared to the term y2 of the vertical coordinate in the Expression (1).

In other words, in the distance function in the Expression (3), when the aspect ratio $A_j$ is larger than 1, a value which is smaller than an actual distance (Euclidean distance) is provided with respect to the horizontal direction, and a value which is larger than the actual distance is provided with respect to the vertical direction as a conversion distance between arbitrary points (x', y') and the generatrix $M_j$. Incidentally, in the voronoi tessllation, the arbitrary points on the canvas are determined to be points which belong to the generatrix of which a conversion distance which is calculated using the distance function is the closest. Accordingly, when the Expression (3) is used with respect to the image $MP_j$, which is horizontally long, of which the aspect ratio $A_j$ is larger than 1, it is determined that a point which is farther belongs to the generatrix M in the horizontal direction, and in contrast to this, it is determined that a point which is closer belongs to the generatrix $M_j$ in the vertical direction, compared to a case in which Expression (1) is used. As a result, in the voronoi region $VA_j$ corresponding to the image $MP_j$ (FIG. 3), there is a tendency that a voronoi region which is horizontally long is easily formed. On the other hand, in a vertically long image $MP_j$ of which aspect ratio $A_j$ is smaller than 1, there is a tendency that a voronoi region which is vertically long is easily formed in contrast to this. Accordingly, when the distance function in Expression (3) is used, it is possible to perform voronoi tessellation in which the aspect ratio $A_j$ of the image $MP_j$ is reflected.

Figure 5:
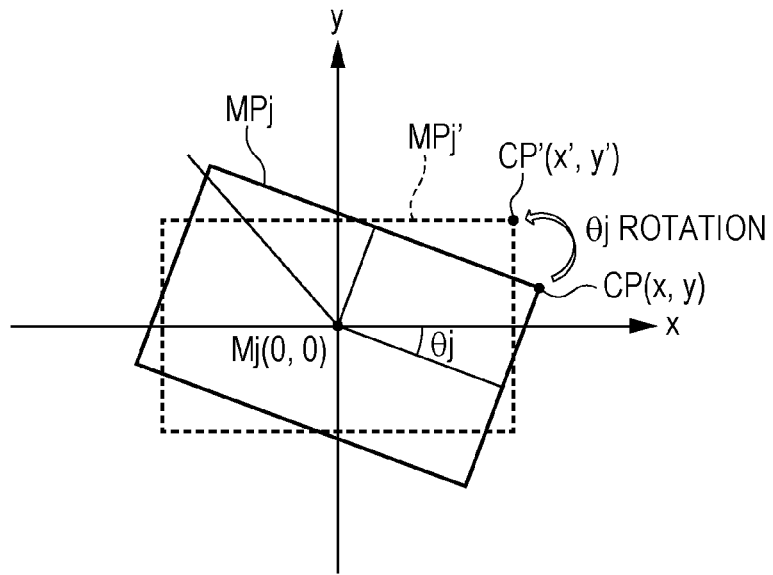
FIG. 5 is an explanatory diagram which describes a distance function in which a rotation angle is also taken into consideration, in addition to the aspect ratio of the material image.

FIG. 5 is an explanatory diagram which describes a distance function in which a rotation angle is also taken into consideration, in addition to the aspect ratio of an image. Here, a case in which the image $MP_j$ is arranged by being rotated clockwise by an angle $\theta_j$ from an image $MP_j'$ in an erected state is presumed. At this time, coordinate transformation in which arbitrary points (x, y) on the canvas 200 are rotated counterclockwise by the angle $\theta_j$ is provided in the following Expressions (5a) and (5b);

$$x' = x \times \cos\theta_j - y \times \sin\theta_j \qquad (5a)$$

$$y' = x \times \cos\theta_j + y \times \sin\theta_j \qquad (5b)$$

when substituting the Expressions (5a) and (5b) in the Expression (4), the following Expression (6) is obtained.

$$d(x, y)_j = \sqrt{\frac{(x')^2}{A_j} + A_j \times (y')^2} \qquad (6)$$

$$= \sqrt{\frac{(x \times \cos\theta_j - y \times \sin\theta_j)^2}{A_j} + A_j \times (x \times \sin\theta_j + y \times \cos\theta_j)^2}$$

The distance function in Expression (6) is a function which provides a conversion distance from the $j$th generatrix $M_j$ with respect to the arbitrary points (x, y) on the canvas. In addition, the distance function is a distance function which includes the aspect ratio $A_j$ of the $j$th image $MP_j$ and the rotation angle $\theta_j$ as parameters. When the distance function in Expression (6) is used, for example, there is a tendency that a region which becomes wider along the width direction of the image $MP_j$ when being arranged using the rotation angle $\theta_j$ is obtained as a shape of the voronoi region $VA_j$ (FIGS. 3A to 3C) with respect to the horizontally long image $MP_j$ of which the aspect ratio $A_j$ is larger than 1. On the other hand, there is a tendency that a region which becomes further wider along the vertical direction of the image $MP_j$ when being arranged using the rotation angle $\theta$ is obtained as a shape of the voronoi region VA with respect to the vertically long image $MP_j$ of which the aspect ratio $A_j$ is smaller than 1. In this manner, when the distance function in Expression (6) is used, it is possible to execute the voronoi tessellation while reflecting both the aspect ratio $A_j$ of the image $MP_j$ and the rotation angle $\theta_j$.

As the distance function, it is also possible to use the following Expression (7) in which the weight $Q_j$ of arrangement size which is related to each image $MP_j$ is taken into consideration;

$$d(x, y)_j = \frac{\sqrt{\frac{(x \times \cos\theta_j - y \times \sin\theta_j)^2}{A_j} + A_j \times (x \times \sin\theta_j + y \times \cos\theta_j)^2}}{Q_j} \qquad (7)$$

here, the weight $Q_j$ is a positive value except for 0. The weight $Q_j$ can be arbitrarily designated with respect to an individual image $MP_j$ by a user.

In the Expression (7), the right side in the Expression (6) is divided by the weight $Q_j$ of arrangement size.

According to Expression (7), the larger than weight $Q_j$, the smaller the conversion distance which is provided using the distance function, and the smaller the weight $Q_j$, the larger the conversion distance which is provided using the distance function. Accordingly, there is a tendency that a large voronoi region is formed with respect to an image with a large weight $Q_j$, compared to an image with a small weight $Q_j$. For example, when a user wants to arrange a favorite image to be large in a collage image, it is possible to make a voronoi region of the image large when the weight $Q_j$ of arrangement size is set to a large value. When there is no such designation, a default setting in which the weight $Q_j$ of arrangement size is set to the same value (for example, constant 1.0, or the like) may be performed with respect to all of images. Alternatively, it may be set such that the collage image creating program 130 generates a random number with respect to an individual image, and a weight $Q_j$ of arrangement size is determined according to the obtained random number.

FIG. 6 is an explanatory diagram which describes an arrangement of each image in the generatrix. In step S170 in FIG. 2, the image arranging program 124 calculates areas of the voronoi regions VA1 to VAn. In step S180, the image arranging program 124 creates a collage image by determining a size of each image $MP_j$ at a time of arranging, and arranging a center of the image $MP_j$ at each generatrix $M_j$ in a state of rotating the image by the rotation angle $\theta_j$. Here, the image arranging program 124 can calculate the size of the image $MP_j$ at the time of arranging according to the following expression, for example;

$$WW_j = \alpha \times W_j \qquad (8a)$$

$$HH_j = \alpha \times H_j \qquad (8b)$$

$$S_j = WW_j \times HH_j \qquad (8c)$$
$$= \alpha^2 \times W_j \times H_j$$

here, $WW_j$ and $HH_i$ denote the width and height of the image $MP_j$ at the time of arranging, $W_j$ and $H_j$ denote the width and height of the image $MP_j$ at the time of inputting, $\alpha$ denotes a coefficient, and $S_j$ is an area of the voronoi region $VA_j$.

It is understood that, in Expressions (8a) to (8c), the image $MP_j$ at the time of inputting is magnified (or reduced) by a magnification of $\alpha$ so that the size of the image $MP_j$ ($WW_j \times HH_j$) at the time of arranging becomes equal to the area $S_j$ of the voronoi region $VA_j$. Expressions which denote the width WW and the height $HH_j$ of the image $MP_j$ at the time of arranging can be rewritten into the following expressions using the aspect ratio $A_j$ ($=W_j/H_j$) of the image.

$$WW_j = \alpha \times W_j \quad (9a)$$
$$= \sqrt{\frac{S_j}{W_j \times H_j}} \times W_j$$
$$= \sqrt{S_j \times A_j}$$

$$HH_j = \alpha \times H_j \quad (9b)$$
$$= \sqrt{\frac{S_j}{W_j \times H_j}} \times H_j$$
$$= \sqrt{\frac{S_j}{A_j}}$$

In addition, Expressions (9a) and (9b) may be expanded as follows;

$$WW_j = \beta \times \sqrt{S_j \times A_j} \quad (10a)$$

$$HH_j = \beta \times \sqrt{\frac{S_j}{A_j}} \quad (10b)$$

here, $\beta$ is an arbitrary scaling coefficient. According to Expressions (10a) and (10b), the size ($WW_j \times HH_j$) of the image $MP_j$ at the time of arranging becomes $\beta^2$ times of the area $S_j$ of the voronoi region $VA_j$. As the scaling coefficient $\beta$, it is preferable to use a value less than 1, and it is especially preferable to use a value of approximately 0.9. In addition, as a result of performing an image arrangement by the inventor, it is found that a state of overlapping of each image, or a size of a blank is preferable when using the value of approximately 0.9 as a value of scaling $\beta$.

Figure 7A:
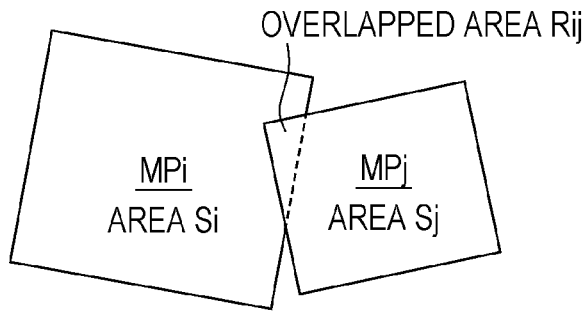
FIGS. 7A and 7B are explanatory diagrams which describe the arranging order of each material image in the collage image.
Figure 7B:
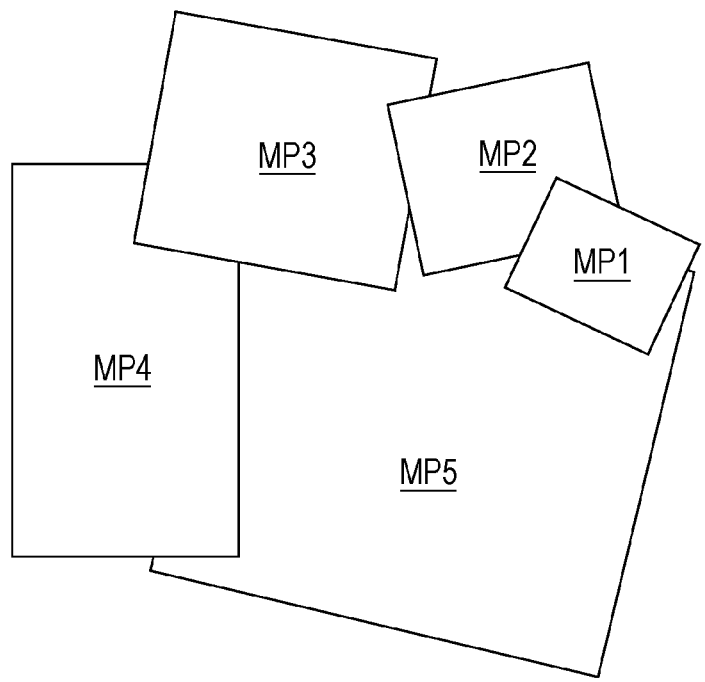

FIGS. 7A and 7B are explanatory diagrams which describe arranging order of images in the collage image. According to the embodiment, when determining the overlapping order of two arbitrary images MPi and $MP_j$ which configure a collage image, it is determined as follows based on the area $Ri_j$ of the overlapped portion, and the areas Ri and $R_j$ at the time of arranging two images MPi and $MP_j$.

(1) When $Ri_j/Ri \geq Ri_j/R_j$: image MPi is arranged on the front side (2) When $Ri_j/Ri < Ri_j/R_j$: image $MP_j$ is arranged on the front side In other words, between two arbitrary images MPi and $MP_j$, an image of which an area (image size) at the time of arranging is smaller is arranged on the front side. In this case, as illustrated in FIG. 7A, a part of the image MPi which is arranged on the rear side (lower side) is hidden by the image $MP_j$ which is arranged on the front side, however, recognizability of each image does not extremely worsen. In contrast to this, when the image MPi of which the area at the time of arranging is arranged on the front side, recognizability of the image $MP_j$ becomes worse, since a covered rate of the image $MP_j$ of which the area is small becomes large. In the example in FIG. 7B, an image of which the area at the time of arranging is small among five images of MP1 to MP5 is arranged on the front side in order. In this manner, since a smaller image is arranged on the front side compared to others, it is possible to make visibility of each image not to be poor.

In step S190 in FIG. 2, the collage image creating program 130 displays the created collage image on the display unit 150. In step S200, the collage image creating program 130 makes an inquiry to a user whether or not to re-edit the created collage image. When re-editing is not performed, the process of the collage image creating program 130 shifts to step S210, and creating of the collage image is completed. When re-editing is performed, the process of the collage image creating program 130 shifts to step S205. In step S205, additional editing from a user is received. The process of the collage image creating program 130 shifts to step S140 thereafter, and the same process is executed. As a result, the voronoi tessellation process is re-executed, and a collage image is recreated, and is redisplayed. Accordingly, every time a user performs additional editing, a collage image which is changed according to the additional editing is obtained.

The following are examples of the additional editing which are performed in step S205.

1. Addition or Deletion of Image:

When adding an image, a selection of a new image by a user, and a designation of a rotation angle $\theta_j$ or a weight $Q_j$ of arrangement size of the image are performed. In this case, for example, the user may instruct the addition of the image by selecting the additional image on a screen, and performing drag and drop of the selected image with respect to the collage image. In addition, when deleting an image, the user may delete the image by selecting an arbitrary image in the collage image as a deletion target.

When one image is added or deleted, there is a possibility that an arrangement size of another image may be changed. Specifically, there is a tendency that, when one image is added, another image becomes small, and when one image is deleted, another image becomes large. However, there is also a case in which only a partial image among other images is influenced.

2. Change in Arrangement Size:

When an arrangement size is changed, an arrangement size (size) of an image included in a collage image is changed by a user. The change of the arrangement size is performed, for example, by dragging a side of an image to be changed. In addition, when the collage image creating device 10 includes a touch panel, the arrangement size may be changed using a "pinching operation" in which two fingers are placed on the touch panel, and an image is enlarged or reduced. The pinching operation includes an operation of enlarging an image (referred to as pinch-out operation, pinch-open operation, or the like), and an operation of reducing an image (referred to as pinch-in operation, pinch-close operation, or the like). In addition, the arrangement size may be changed by changing the weight $Q_j$ of arrangement size. When an arrangement size of one image is changed, there is a possibility that an arrangement size of another image may be also changed. Specifically, there is a tendency that, when one image becomes large, another image becomes small, and when one image becomes small, another image becomes large. However, there is also a case in which only a partial image among other images is influenced.

3. Change in Rotation Angle $\theta_j$:

When a rotation angle $\theta_j$ of an image in a collage image is changed, a shape of a voronoi region corresponding to the image in a collage image is changed according to the shape. Here, a shape of another image is also changed according to the change.

4. Change in Arrangement Position:

An arrangement position of an image may be changed by moving the image in a collage image. An instruction of changing the arrangement position can be executed, for example, when a user performs drag and drop of one arbitrary image MPi with respect to a position of another arbitrary image $MP_j$ on a screen of a collage image, and when an exchange of positions of the images MPi and $MP_j$ is instructed.

FIG. 8 is an explanatory diagram which describes a case in which the weight $Q_j$ of an arrangement size is changed due to additional editing. In the example, the weight $Q_j$ of arrangement size of the image MP2 is changed from 1.0 to 1.6. In this case, due to the process which is described in FIG. 2, the voronoi tessellation process is re-executed, and the images M1 to M5 are rearranged. When comparing the image with the collage image in FIG. 6, the image MP2 becomes large, and other images MP1, MP3, MP4, and MP5 become small by that much. In addition, in FIG. 8, the overlapping order of images is changed from the collage image in FIG. 6.

As described above, it is possible to determine an arrangement position of an image by executing centroidal voronoi tessellation using a distance function including an aspect ratio $A_j$ of an image, a rotation angle, and a weight of arrangement size as parameters. In addition, only a necessary parameter in the parameters of the aspect ratio of an image, the rotation angle, and the weight of arrangement size may be appropriately used. That is, one or two among the parameters of the aspect ratio $A_j$ of an image, the rotation angle, and the weight of arrangement size may be used. In addition, none of parameters may be used. In addition, it is possible to recreate a collage image by changing arrangements of all of images including other images, according to a change when at least one of the arrangement position, the rotation angle, and the arrangement size is changed with respect to an image which is arranged in the collage image. In addition, it is possible to recreate a collage image by changing arrangements of all of images including other images, according to a change due to an addition or deletion of an image which configure the collage image. That is, it is possible to recreate a collage image by re-executing a determination of arrangements of a plurality of images according to at least one of a change due to an addition or deletion of an image which configure the collage image, a change in arrangement position of at least one image among images which are included in the collage image, a change in rotation angle of at least one image among images which are included in the collage image, and a change in arrangement size of at least one image among images which are included in the collage image.

In the embodiment, the distance function $d(x, y)_j$ in Expression (7) is used, however, it is also possible to generalize Expression (7) into the following expression;

$$d(x, y)_j = \sqrt{\frac{(x \times \cos\theta_j - y \times \sin\theta_j)^2}{f_1(A_j)} + f_2(A_j) \times \frac{(x \times \sin\theta_j + y \times \cos\theta_j)^2}{Q_j}} \quad (11)$$

here, $f_1(A_j)$ is a function which provides a positive value which has a positive correlation with the aspect ratio $A_j$, and $f_2(A_j)$ is a positive constant except for 0, or a function which provides a positive value which has a positive correlation with the aspect ratio $A_j$. In addition, as described above, x and y are coordinates of arbitrary points on a coordinate system in which generatrix M is the origin, $\theta_j$ is a rotation angle of an image (angle measured clockwise in an erected state), and $Q_j$ is a weight of arrangement size of the image.

As f1 $(A_j)$, square of the aspect ratio $A_j$, or square root of the aspect ratio $A_j$ may be used, for example. The same is applied to f2 $(A_j)$. In addition, as f2 (A), 1.0 which is constant may be used. It is possible to change an expansion of the voronoi region according to an aspect ratio $A_j$ of an image.

In addition, Manhattan distance may be used instead of Euclidean distance. In this case, it is possible to use the following expression instead of the Expression (11).

$$d(x, y)_j = \frac{\frac{|x \times \cos\theta_j - y \times \sin\theta_j|}{f_1(A_j)} + f_2(A_j) \times \frac{|x \times \sin\theta_j + y \times \cos\theta_j|}{Q_j}} \quad (12)$$

Second Embodiment

FIG. 9 is an explanatory diagram of a determining algorithm when arranging an image which is used in a second embodiment. Here, an oval $EL_j$ corresponding to an individual image $MP_j$ is used. Two diameters $L1_j$ and $L2_j$ of the oval $EL_j$ are determined according to an aspect ratio $A_j$ of an image $MP_j$ and a weight $Q_j$ of arrangement size. For example, it is possible to set so as to be $L1_j = Q_j \sqrt{A_j}$, $L2_j = Q_j/\sqrt{A_j}$. In addition, in the initial state, it is possible to arrange a center $O_j$ of each oval $EL_j$ at an arbitrary position in the canvas 200. In addition, $L1_j$ and $L2_j$ correspond to a long axis and a short axis of the oval $EL_j$. In FIG. 9, $L1_j$ corresponds to the long axis, and $L2_j$ corresponds to the short axis. However, $L2_j$ may correspond to the long axis, and $L1_j$ may correspond to the short axis. In addition, the oval $EL_j$ is not necessarily oval, and may be a circle (also referred to as perfect circle, or precise circle) which satisfies a relationship of $L1_j = L2_j$.

When arranging these ovals $EL_j$, for example, calculations are repeatedly performed so that the arrangement is converged under the following limitations.

<Limitation 1> All of ovals $EL_j$ are accommodated in the canvas 200.

<Limitation 2> Each oval $EL_j$ does not overlap with another oval, and ovals are separated from each other.

<Limitation 3> Each oval $EL_j$ receives a repulsive force which is inversely proportional to the square of the shortest distance between the oval and another individual oval.

<Limitation 4> Each oval $EL_j$ receives a repulsive force which is inversely proportional to the square of the shortest distance from each of four frames of the canvas 200.

An arrangement determining process of such an oval can be used instead of the voronoi tessellation process according to the first embodiment. When the arrangement determining process of the oval is converged, as illustrated at the lower part in FIG. 9, it is possible to obtain an arrangement result in which each oval $EL_j$ is appropriately separated from another oval and the frame of the canvas 200, respectively. Thereafter, it is possible to obtain the same collage image as that which is illustrated at the lower part in FIG. 6 according to the first embodiment, by arranging the center of the image $MP_j$ in a center $O_j$ of each oval $EL_j$.

In addition, similarly to the first embodiment, also in the second embodiment, it is preferable to perform at least one of (1) an addition or a deletion of an image, (2) a change in arrangement size, (3) a change in rotation angle $\theta_j$, and (4) a change in arrangement position. When such an addition and changes are performed by a user, a position of an image is readjusted by re-executing the above described arrangement determining process of the oval.

Similarly to the first embodiment, it is possible to determine an arrangement of an image according to an arrangement algorithm having the aspect ratio $A_j$, the rotation angle $\theta_j$, and the weight $Q_j$ of arrangement size of each image as parameters also in the second embodiment. In addition, when at least one of the arrangement position of an image in the collage image, the rotation angle $\theta_j$ of the image, and the weight $Q_j$ of arrangement size is changed after the collage image is created once, an arrangement of an image is recalculated according to this, and a collage image is recreated. As a result, it is possible to appropriately change various editing items or parameters by a user so that a favorite collage image is obtained. In addition, as the algorithm which determines an arrangement of an image, it is possible to use various algorithms other than the above described algorithm.

When making a conclusion about the collage image creating program which is clarified in the embodiments, the collage image creating program executes a first function of creating a collage image by determining arrangements of the plurality of images according to a placement algorithm including a rotation angle of each image as a parameter, and a second function of recreating a collage image by re-executing the first function according to at least one of a change due to an addition or deletion of an image which configure the collage image, a change in arrangement position of at least one image among images which are included in the collage image, a change in rotation angle of at least one image among images which are included in the collage image, and a change in arrangement size of at least one image among images which are included in the collage image using a computer. In addition, as described above, it is possible to substitute the parameter in the first function for a parameter other than the rotation angle, or not to use the parameter itself. In addition, in other words, the second function is a function which re-executes the first function when there are some changes in the collage image. Accordingly, the second function may be a function which re-executes the first function according to changes other than the above described changes.

According to each of the embodiments, it is possible to easily create a collage image. In addition, it is possible to easily create a collage image in which parameters of an image (for example, rotation angle, or aspect ratio) are taken into consideration. In addition, it is possible to easily recreate a collage image by re-executing a determination on arrangements of a plurality of images according to at least one of a change in arrangement position of at least one image among images which are included in the collage image, a change in rotation angle of at least one image among images which are included in the collage image, and a change in arrangement size of at least one image among images which are included in the collage image. In addition, in each of the embodiments, the collage image creating program 130 creates a collage image, however, creating of the collage image may be executed using hardware. In addition, as the collage image creating device 10, there is a personal computer, a printer, a smart phone, a tablet terminal, or the like, for example.

Hitherto, the embodiment of the invention has been described based on several embodiments, however, the embodiments of the invention are made for ease of understanding of the invention, and do not limit the invention. The invention does not depart from the spirit and the scope of claims, can be modified or improved, and can include equivalents thereof as a matter of course.

The entire disclosure of Japanese Patent Application No. 2013-209934, filed Oct. 7, 2013 is expressly incorporated reference herein.

What is claimed is:

1. A collage image creating method which creates a collage image by arranging a plurality of images comprising:
    a first step that creates a collage image by determining arrangements of the plurality of images according to a placement algorithm using a weighted distance function that is based in part on an aspect ratio of each image as a parameter, the placement algorithm is a centroidal voronoi tessellation that uses the weighted distance function; and
    a second step that recreates a collage image by re-executing the first step according to at least one of a change due to an addition or deletion of an image which configures the collage image, a change in arrangement position of at least one image among images which are included in the collage image, a change in rotation angle of at least one image among images which are included in the collage image, and a change in arrangement size of at least one image among images which are included in the collage image.

2. The collage image creating method according to claim 1, wherein, in the first step, the collage image is created by determining arrangements of the plurality of images according to a placement algorithm further including a rotation angle of each image as a parameter.

3. The collage image creating method according to claim 1, wherein the weighted distance function is provided using any one of the following expressions;

$$d(x,y)_j = \sqrt{\frac{(x \times \cos\theta_j - y \times \sin\theta_j)^2}{f_1(A_j)} + f_2(A_j) \times \frac{(x \times \sin\theta_j + y \times \cos\theta_j)^2}{Q_j}}$$ Expression 1

$$d(x,y)_j = \frac{\frac{|x \times \cos\theta_j - y \times \sin\theta_j|}{f_1(A_j)} + f_2(A_j) \times |x \times \sin\theta_j + y \times \cos\theta_j|}{Q_j}$$

here, x and y are coordinates of arbitrary points on a coordinate system in which a generatrix of a voronoi region is set to the origin, $\theta_j$ is a rotation angle of an image, $Q_j$ is a weight of an arrangement size of the image, f1 ($A_j$) is a function which provides a positive value including a positive correlation with respect to the aspect ratio $A_j$, and f2 ($A_j$) is a positive constant which is not zero, or a function which provides a positive value with a positive correlation with respect to the aspect ratio $A_j$.

4. The collage image creating method according to claim 1, wherein, in the collage image, an overlapping order of the plurality of images is determined so that an image of which an image size at a time of arranging is small is arranged at a front side in the collage image.

5. The collage image creating method according to claim 1, wherein at least one of the images has a non-zero rotation angle.

* * * * *